(12) United States Patent
Villeminey

(10) Patent No.: US 7,201,426 B2
(45) Date of Patent: Apr. 10, 2007

(54) VEHICLE SEATING APPARATUS

(75) Inventor: Jean-Paul Villeminey, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/253,142

(22) Filed: Oct. 18, 2005

(65) Prior Publication Data
US 2006/0097538 A1 May 11, 2006

Related U.S. Application Data

(60) Provisional application No. 60/626,557, filed on Nov. 10, 2004.

(51) Int. Cl.
*B60N 2/02* (2006.01)

(52) U.S. Cl. ..................................... 296/65.09; 296/66

(58) Field of Classification Search ............. 296/65.09, 296/65.13, 69, 65.16, 65.05, 66, 65.1, 37.14; 297/327, 329, 335, 341, 15, 378.12
See application file for complete search history.

(56) References Cited

U.S. PATENT DOCUMENTS

| | | | | |
|---|---|---|---|---|
| 3,311,405 | A * | 3/1967 | Brennan et al. ............... 296/66 |
| 4,699,418 | A * | 10/1987 | Plavetich ................. 296/65.09 |
| 4,805,953 | A * | 2/1989 | Yamauchi ................. 296/65.09 |
| 5,383,699 | A * | 1/1995 | Woziekonski et al. ... 296/65.09 |
| 5,482,349 | A * | 1/1996 | Richter et al. ........... 296/65.09 |
| 5,542,745 | A * | 8/1996 | Takeda et al. .......... 297/378.12 |
| 5,570,931 | A * | 11/1996 | Kargilis et al. .......... 296/65.09 |
| 5,868,451 | A * | 2/1999 | Uno et al. .................... 296/66 |
| 6,000,742 | A * | 12/1999 | Schaefer et al. ......... 296/65.09 |
| 6,123,380 | A * | 9/2000 | Sturt et al. ............... 296/65.09 |
| 6,293,603 | B1 * | 9/2001 | Waku et al. ............. 296/65.09 |
| 6,435,589 | B2 * | 8/2002 | Shimizu et al. .......... 296/65.09 |
| 6,644,730 | B2 * | 11/2003 | Sugiura et al. .......... 296/65.09 |
| 6,648,392 | B2 * | 11/2003 | Fourrey et al. .......... 296/65.09 |
| 6,746,083 | B2 * | 6/2004 | Drew et al. .............. 296/65.09 |
| 6,827,394 | B2 * | 12/2004 | Watanabe et al. ............. 296/69 |
| 6,869,138 | B2 * | 3/2005 | Rhodes et al. ........... 296/65.09 |
| 6,997,498 | B2 * | 2/2006 | Oyama .................... 296/65.05 |
| 7,029,063 | B2 * | 4/2006 | Holdampf .................... 296/66 |
| 7,066,519 | B2 * | 6/2006 | Rhodes et al. ................ 296/66 |
| 7,077,451 | B2 * | 7/2006 | Rhodes et al. ........... 296/65.01 |

OTHER PUBLICATIONS

Jean-Paul Villeminey, U.S. Appl. No. 11/213,402 filed Aug. 26, 2005, "Occupant Seat System". assigned to GM Global Technology Operations, Inc.

* cited by examiner

*Primary Examiner*—Kiran B. Patel
(74) *Attorney, Agent, or Firm*—Kathryn A. Marra

(57) ABSTRACT

This invention relates to vehicle having a conveniently storable passenger seat. The seat is collapsible into an on-floor or stowed position. A user can stow the seat using only one hand. A release member is activated to permit the seat to move from an upright position to the collapsed position. A tub area which stows the seat is concealed by a floor covering member which has flippers that automatically retract upon activation of the release member. The seat is also capable of reclining. Moreover, the seat remains adjustable in the forward and rearward directions with respect to the vehicle cab. This type of arrangement is ideal for passenger vehicles with two or more rows of seating, like SUVs, vans, and minivans.

7 Claims, 5 Drawing Sheets

VEHICLE SEATING APPARATUS

CROSS-REFERENCE TO RELATED APPLICATIONS

This application claims the benefit of U.S. Provisional Application 60/626,557 filed Nov. 10, 2004, which is hereby incorporated by reference in its entirety.

TECHNICAL FIELD OF THE INVENTION

The present invention relates to seating systems for vehicles that fold or are otherwise configurable to reduce the vertical space that is occupied by the seating system.

BACKGROUND OF THE INVENTION

Many vehicles have a cargo area located at the rear of the vehicle. The cargo area is often bordered on one side by a passenger seating apparatus that folds or is otherwise configurable to reduce the vertical space occupied by the passenger seat and thereby expand the cargo area.

SUMMARY OF THE INVENTION

A stowable passenger seat assembly for a vehicle is provided. The passenger seat assembly includes a lower seat portion and a seatback portion. A rail supports the lower seat portion and defines a first elongated slot. A first slide member is at least partially within the first elongated slot, and is selectively movable within the first elongated slot. A first link is pivotably connected to a first stationary bracket and is pivotably connected with respect to the rail via the first slide member.

A second link defines a second elongated slot and is pivotably connected to a second stationary bracket and the rail. A second slide member is at least partially within the second elongated slot, and is selectively movable within the second elongated slot. A third link is pivotably connected to the first link and is pivotably connected with respect to the second link via the second slide member.

The first, second, and third link selectively guide the lower seat portion and the seatback portion between a first position in which the lower seat portion is above a vehicle floor and occupiable, a second position in which the lower seat portion is forward of and below the first position in a first stowed configuration, and a third position preferably fully contained in a cavity in the floor of the vehicle body in a second stowed configuration. Preferably, a hinged floor panel covers the cavity when the lower seat portion is in the first position, and is selectively retractable to expose the cavity during movement of the lower seat portion to the second position.

The passenger seat assembly of the invention is characterized by its mechanically simple stowage, requiring the use of only one hand and one forward and downward motion, and its adaptable design that easily accommodates the packaging constraints of different vehicles.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
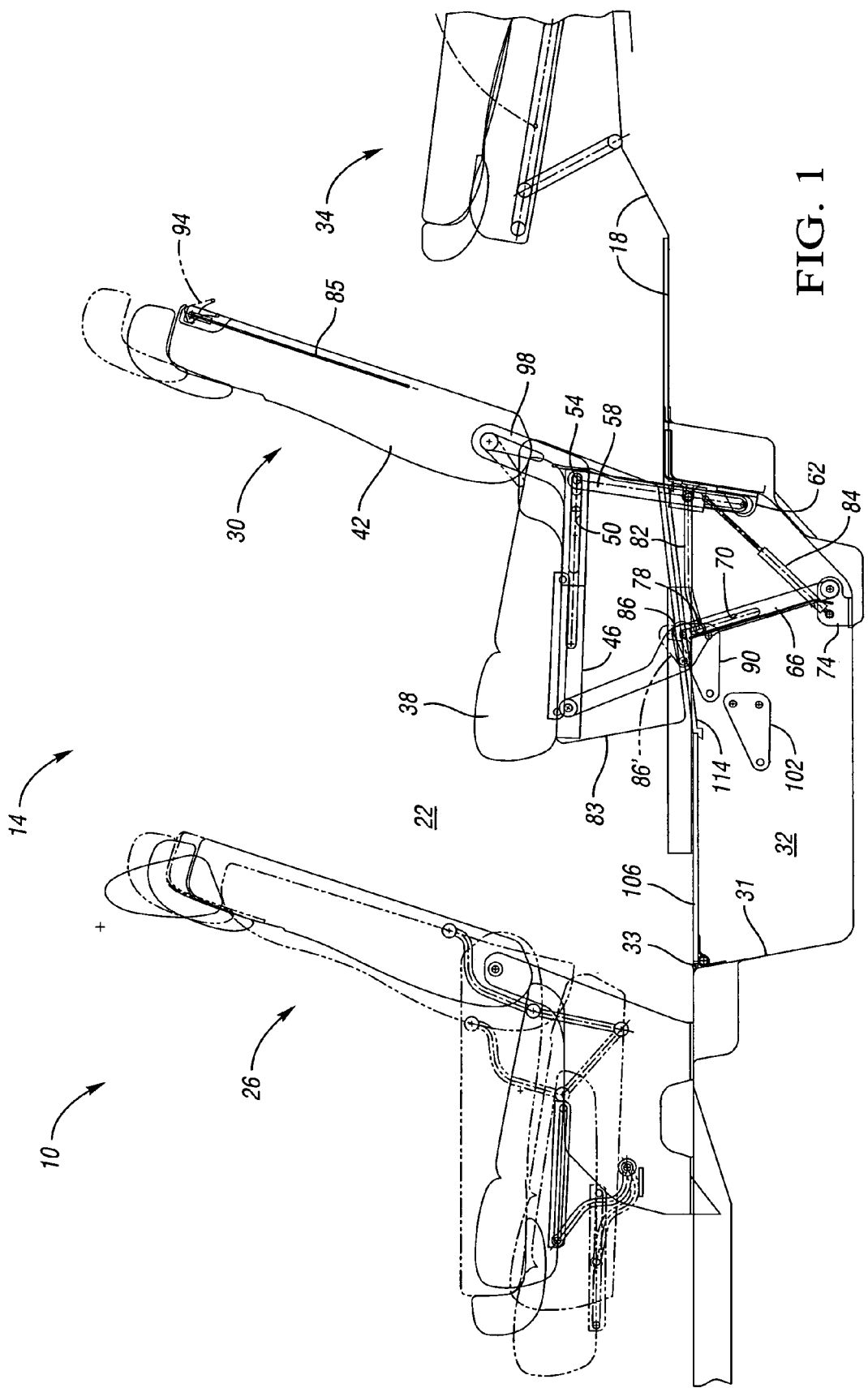
FIG. 1 is a schematic side elevation view of a vehicle interior with a stowable seat assembly in an upright, occupiable configuration.

Referring FIG. 1, a vehicle 10 includes a body 14. The body 14 includes a floor 18 that partially defines interior compartment 22. The vehicle 10 also includes a plurality of passenger seat assemblies including front seat assembly 26, midsection seat assembly 30 behind front seat assembly 26, and rear seat assembly 34 behind midsection seat assembly 30. A tub 31 defines a cavity 32 that is accessible by an opening 33 in the floor 18.

Figure 2:
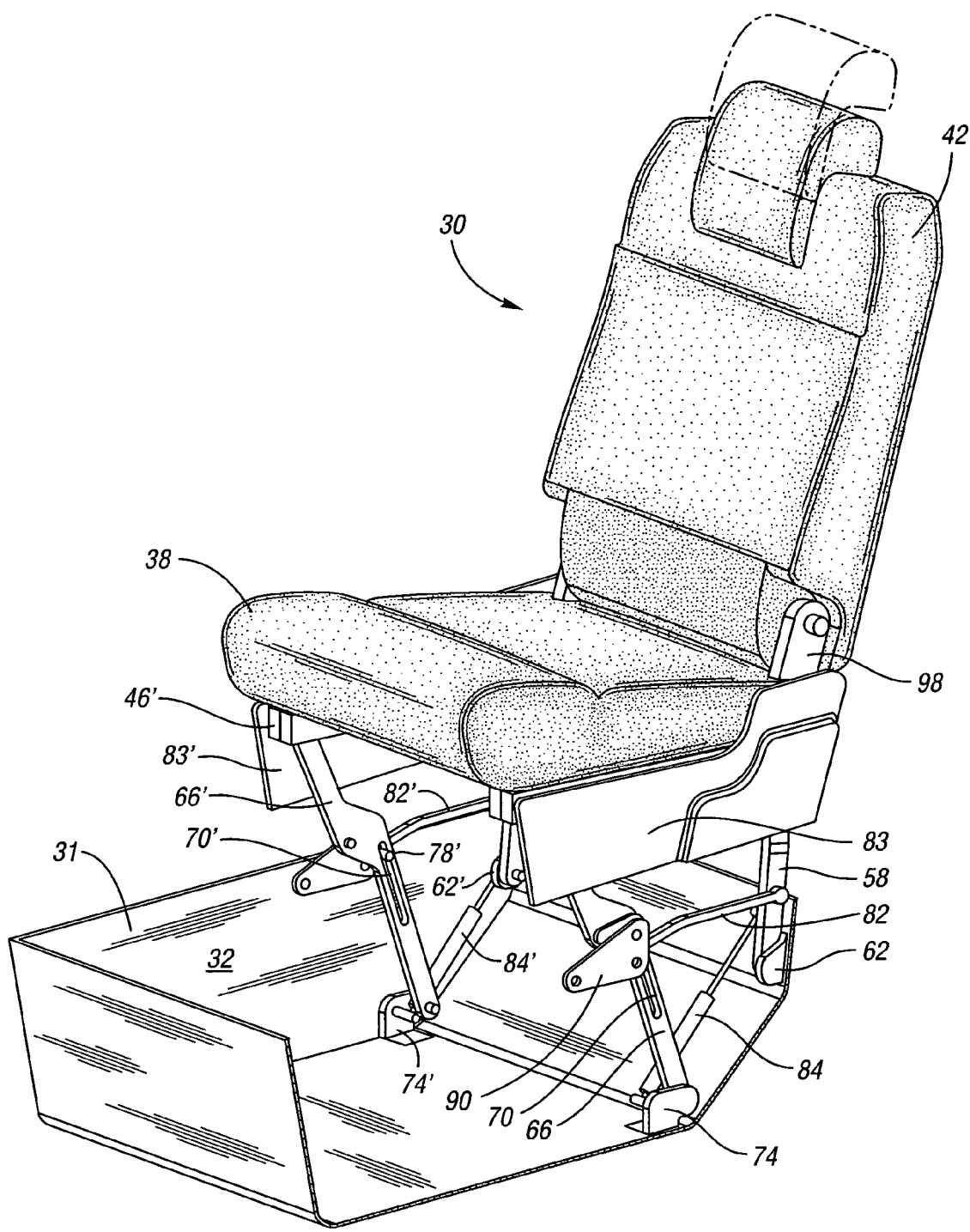
FIG. 2 is a schematic perspective view of the stowable seat assembly of FIG. 1 in the upright, occupiable configuration.

Referring to FIGS. 1–2, seat assembly 30 includes a lower seat portion 38 and a seatback portion 42. A rail 46 supports the lower seat portion 38 and defines a first elongated slot 50. A first slide member 54 is at least partially within the first elongated slot 50, and is selectively movable within the first elongated slot 50.

A first set of links on one side of the seat assembly 30 includes a first link 58 that is pivotably connected to a first stationary bracket 62 at one end and is pivotably connected with respect to the rail 46 via the first slide member 54 at the other end. Within the scope of the claimed invention, the first slide member 54 may or may not be an integral part of the first link 58. The first stationary bracket 62 is rigidly mounted to a rear wall of the tub 31. A second link 66 defines a second elongated slot 70 and is pivotably connected to a second stationary bracket 74 at one end and to the rail 46 at another end. The second stationary bracket 74 is rigidly mounted to the tub 31 at a location that is lower and further forward than the first bracket 62. A second slide member 78 is at least partially within the second elongated slot 70, and is selectively movable within the second elongated slot 70.

Figure 3:
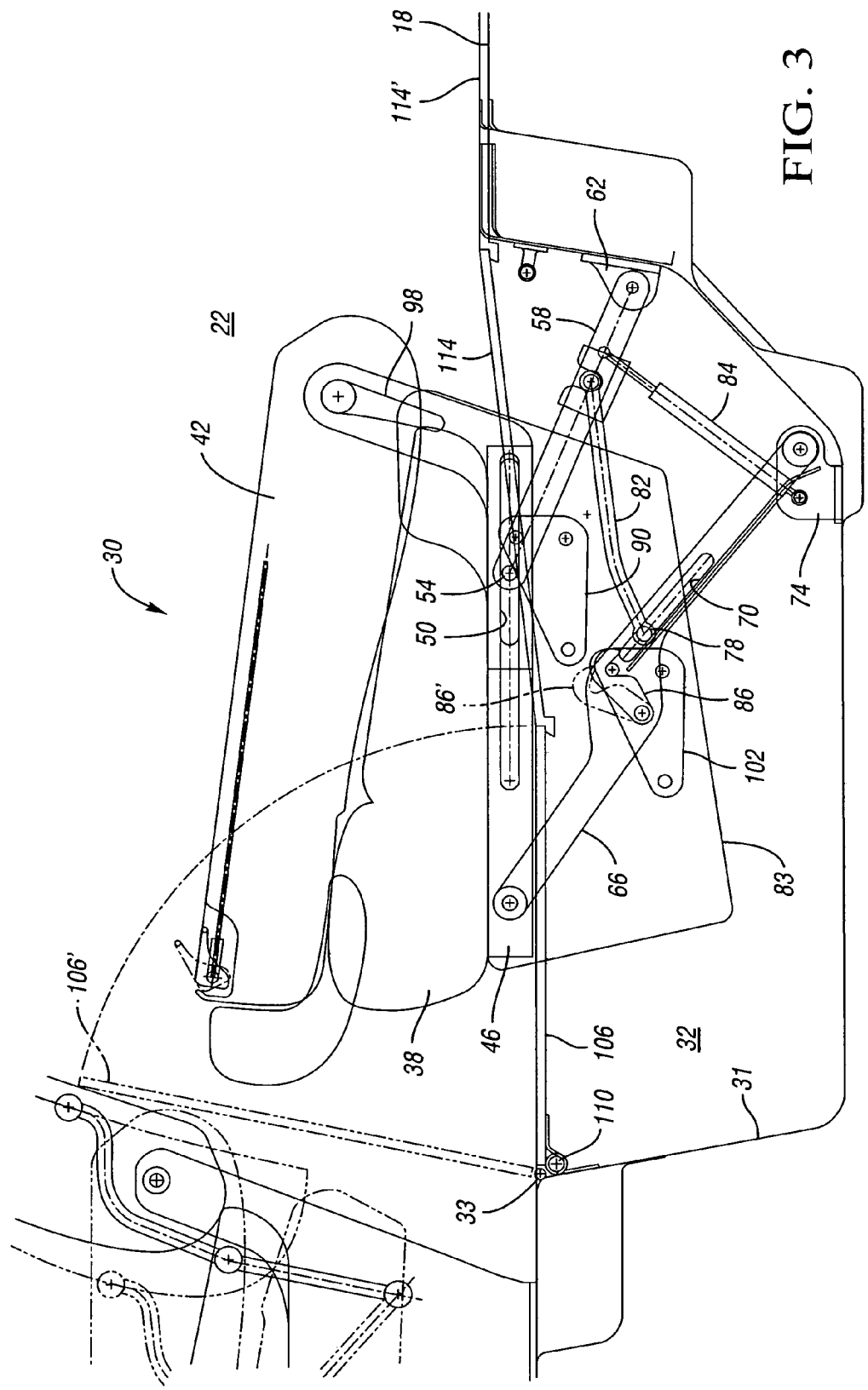
FIG. 3 is a schematic side elevation view of the stowable seat assembly of FIG. 1 in a first stowed configuration.

A third link 82 is pivotably connected to the first link 58 at one end, and is pivotably connected with respect to the second link 66 via the second slide member 78 at the other end. Within the scope of the claimed invention, the second slide member 78 may or may not be an integral part of the third link 82. As shown in FIGS. 1 and 3, a strut 84 preferably interconnects the second bracket 74 and the first link 58 to provide resistance to the rotation of the first link 58 about the first bracket 62.

As depicted in FIG. 2, the seat assembly 30 includes a second set of links, brackets, etc. 46', 58', 62', 66', 70' 74', 78', 82', 84' substantially similar in form and function to links, brackets, etc. 46, 50, 54, 58, 62, 66, 70, 74, 78, 82, 84. Also as shown in FIG. 2, side panels 83, 83' conceal the links from view.

The seat assembly 30 is shown in a first position, in which the seatback portion 42 is generally vertically oriented, and the lower seat portion 38 is in a first position with respect to the vehicle 10. More specifically, the lower seat portion 38 is supported a distance above the floor 18 by the first link 58 and the second link 66. A first latch 86, shown as a hook in the embodiment depicted, is connected to one of the links in the first set of links, specifically the second link 66 in the embodiment depicted. A first complementary latch member 90 is affixed to a side wall of the tub 31, and is engageable with the latch 86 to retain the lower seat portion 38 in the first position by restricting movement of the link 66. If desired, a second latch (not shown) similar to the first latch 86 could be positioned to latch one of the links in the second set to a latch member such as 90, 102 on the opposite side of the seat assembly 30 or at a bracket such as 62 at the back of the seat assembly 30.

Figure 4:
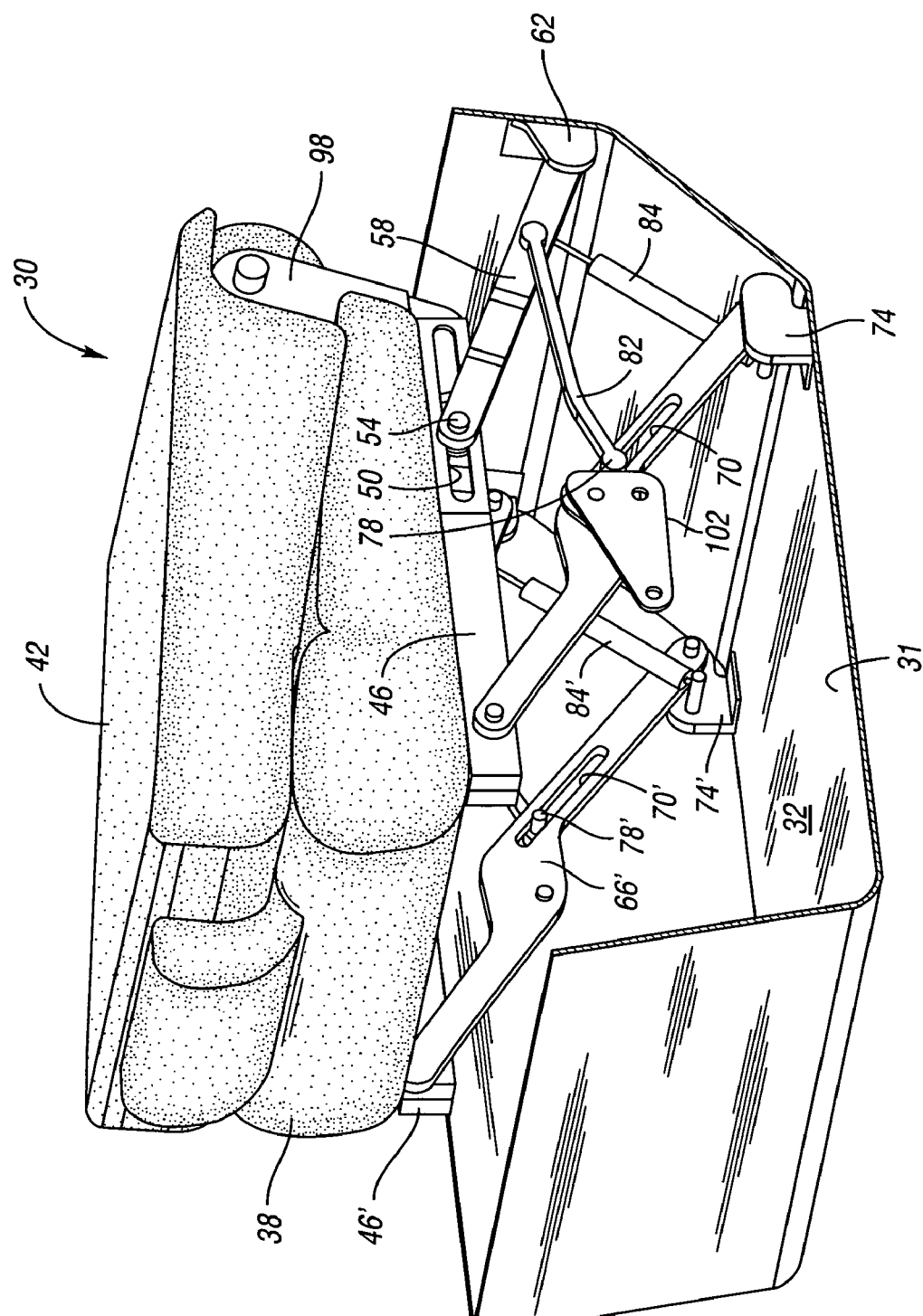
FIG. 4 is a schematic perspective view of the stowable seat assembly of FIG. 1 in the first stowed configuration.

A latch release handle 94 is located on the upper rear portion of the seatback member 42, and is selectively operable by a cable link 85 to move the latch 86 to a disengaged position (shown in phantom at 86' in FIG. 1). When a latch is disengaged, the seat assembly 30 is free to move from the first occupiable position to a first stowed configuration, as shown in FIGS. 3 and 4. In the shown embodiment the latch release handle 94 is operatively connected to the latch 86 via the cable link 85. Upon lifting the latch release handle 94 again, the cable link 85 translates the latch 86 from the engaged position shown to the disengaged position 86'. The latch release handle 94 is configured to allow an individual to actuate the latch 86 and thereby conveniently fold or un-fold the seat assembly 30 using one hand.

Referring to FIGS. 3–4, the seatback portion 42 is pivotably mounted with respect to the lower seat portion 38 at bracket 98. In the second seat assembly position or first stowed configuration, the seatback portion 42 is pivoted forward about bracket 98 so as to be generally horizontally oriented and to extend above and over the lower seat portion 38. The lower seat portion 38 is in a second position with respect to the vehicle, wherein the lower seat portion 38 is further forward and downward than in the occupiable seat position shown in FIGS. 1–2. During movement of the lower seat portion 38 from the first or occupiable position to the second position or first stowed configuration, the first link 58 is pivoted forward about the first stationary bracket 62, and the second link 66 is pivoted forward about the second stationary bracket 74. The first sliding member 54 moves forward with respect to the first slot 50, the first slot 50 limiting movement of the first sliding member, and accordingly, guiding the relative movement of the rail 46, lower seat portion 38, and the first link 58. The second sliding member 78 moves within the second slot 70. The struts 84, 84' are compressed, storing energy that will assist the seat assembly 30 in returning to the first configuration. The latch 86 is engaged with a second complementary latch member 102 to retain the lower seat portion in the second position or first stowed configuration.

In the second position, the lower seat portion 38 remains above the floor 18 and outside the cavity 32. Referring specifically to FIG. 3, a floor panel 106 is pivotably connected to the floor 18 at the opening 33 by a hinge 110, and is selectively movable between a closed position in which the panel 106 is generally horizontally oriented to cover the forward portion of the cavity 32, and an open position, shown at 106', in which the panel is pivoted about the hinge 110 to provide selective access to the cavity 32. A latch (not shown) preferably releasably retains the panel 106 in the closed position, and releases when the release handle 94 is pulled. A spring (not shown) preferably biases the panel 106 in the open position so that when the latch is disengaged, the spring moves the panel to the open position.

Panel 114 is slidable with respect to the vehicle floor 18, and is movable between a closed position in which the panel 114 covers the rearward portion of the cavity 32, and an open position, shown at 114', in which the panel 114 is rearward of the cavity 32. Panel 114 includes sufficient slots to accommodate the links 58, 66. In their respective closed positions, panels 106 and 114 contact each other to cooperatively conceal and close the cavity formed by the tub.

Figure 5:
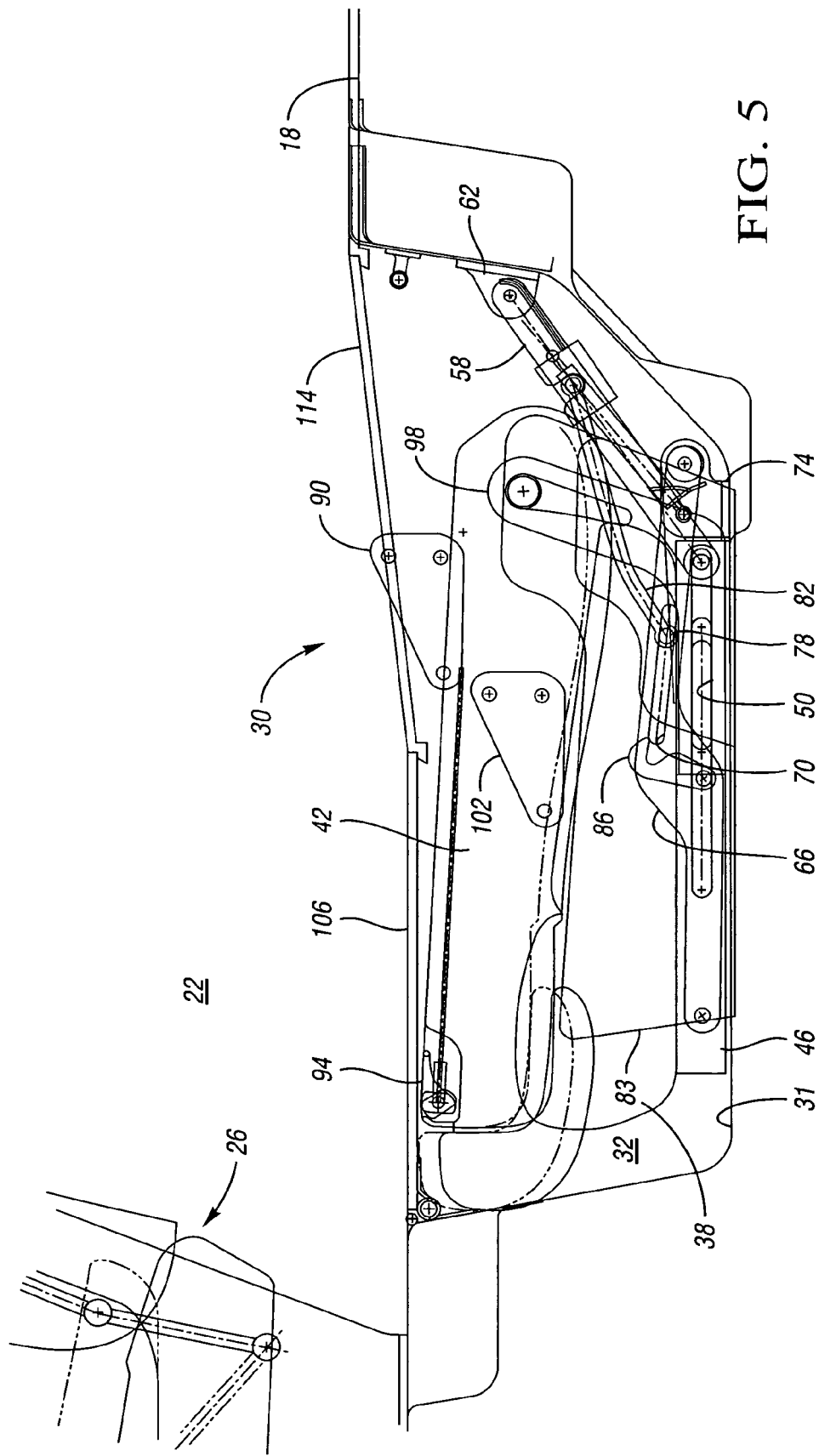
FIG. 5 is a schematic side elevational view of the stowable seat assembly of FIG. 1 in a second stowed configuration.

When panels 106, 114 are open, the seat assembly 30 is movable from the second position or first stowed configuration to a third position or second stowed configuration, as shown in FIG. 5. Referring to FIG. 5, the lower seat portion 38 and the seatback portion 42 are entirely located in the cavity 32 formed by the tub 31. The panels 106, 114 are moved back to their respective closed positions to cover the seat assembly 30 and the cavity 32, and to provide a flat continuous surface with the floor 18 upon which cargo may be placed. In moving from the first stowed configuration to the second stowed configuration, the first and second links 58, 66 are further pivoted about the first and second stationary brackets 62, 74, respectively. The lower seat portion 38 is in a third position with respect to the vehicle 10 (shown in FIG. 1) wherein the lower seat portion 38 is lower and further forward than in the first and second positions.

The side panels 83, 83' are movable up and down with respect to the lower seat portion 38 so as not to interfere with movement of the lower seat portion 38 into the cavity 32. The side panels 83, 83' are preferably spring-biased in the downward direction so that when the seat assembly 30 is returned to the first configuration, the side panels 83, 83' automatically conceal the links and brackets.

It may be desirable to provide a seat track (not shown) between the rail 46 and the lower seat portion 38 and seatback portion 42 to provide selective fore/aft adjustment of the seat. Alternatively, the rail 46 may define a track with which the lower seat portion and the seatback portion are slidably engaged to provide selective fore/aft translation of the seat. An exemplary seat track is described in U.S. Pat. No. 5,482,243, issued Jan. 9, 1996 to Minder, which is hereby incorporated by reference in its entirety.

While the best modes for carrying out the invention have been described in detail, those familiar with the art to which this invention relates will recognize various alternative designs and embodiments for practicing the invention within the scope of the appended claims.

The invention claimed is:
1. A vehicle seating and storage system, comprising:
a seat assembly, having a lower seat portion and a seatback portion pivotably connected with respect to said lower seat portion, said lower seat portion including a rail member;
a vehicle floor defining a cavity, said seat assembly collapsible and fittable with respect to said cavity upon activation of a release handle;
a plurality of linkages to support said lower seat portion and pivotable with respect to said cavity, the plurality of linkages including a first link, a second link, and a third link, the first link having a first end that slides with respect to the rail member, the second link having a slot along which an end of the third link slides;
a latch mounted to a first end of the second link to selectively prevent said plurality of linkages from pivoting with respect to said cavity; and
a plurality of brackets pivotably connected to at least one of said plurality of linkages and securely mounted with respect to said cavity.

2. The system of claim 1, wherein said seat assembly is configured to collapse into a stowed configuration.

3. The system of claim 2, wherein said release handle is mechanically linked to said latch via a cable.

4. The system of claim 3, wherein said latch is securable at a plurality of complementary latch members into a plurality of positions in a manner to prevent said plurality of linkages from rotating with respect to said cavity at each of said plurality of positions.

5. The system of claim 3, wherein said vehicle floor includes a floor panel that covers said cavity.

6. The seating and storage system of claim 1, wherein said plurality of brackets includes a first bracket rigidly mounted with respect to said cavity defined by the vehicle floor and a second bracket rigidly mounted with respect to said cavity forward of and lower than the first bracket; and wherein the first link having a second end that is pivotably connected to said first bracket and the second link having a second end that is pivotably connected to said second bracket.

7. The seating apparatus of claim 6, further comprising a strut interconnecting said second bracket and said first link to provide resistance to a rotation of said first link about said first bracket.

\* \* \* \* \*